United States Patent
Block et al.

(10) Patent No.: US 10,578,228 B2
(45) Date of Patent: Mar. 3, 2020

(54) SENSING MECHANISM FOR VALVE OPERATION

(71) Applicant: Zurn Industries, LLC, Milwaukee, WI (US)

(72) Inventors: Marc G. Block, Apex, NC (US); Chad Williams, Apex, NC (US); Alan Kaid, Cary, NC (US); Michael G. Askew, Garner, NC (US)

(73) Assignee: ZURN INDUSTRIES, LLC, Milwaukee, WI (US)

( * ) Notice: Subject to any disclaimer, the term of this patent is extended or adjusted under 35 U.S.C. 154(b) by 0 days.

(21) Appl. No.: 16/209,489

(22) Filed: Dec. 4, 2018

(65) Prior Publication Data

US 2019/0107224 A1    Apr. 11, 2019

Related U.S. Application Data

(63) Continuation-in-part of application No. 15/714,405, filed on Sep. 25, 2017, and a continuation-in-part of
(Continued)

(51) Int. Cl.
*F16K 31/04* (2006.01)
*F16K 37/00* (2006.01)
*E03D 3/10* (2006.01)
*E03D 3/06* (2006.01)
*F16K 21/00* (2006.01)
(Continued)

(52) U.S. Cl.
CPC ............ *F16K 37/0058* (2013.01); *E03D 3/06* (2013.01); *E03D 3/10* (2013.01); *F16K 21/00* (2013.01); *F16K 21/12* (2013.01); *F16K 31/041* (2013.01); *F16K 31/042* (2013.01); *F16K 31/043* (2013.01); *F16K 31/3855* (2013.01); *F16K 31/404* (2013.01); *F16K 37/0041* (2013.01)

(58) Field of Classification Search
CPC ............ F16K 37/0058; F16K 37/0041; F16K 31/042; F16K 31/043; F16K 31/3855; F16K 31/404; F16K 31/041; F16K 5/0407; E03D 3/10; E03D 3/06
USPC ........... 137/489, 487.5, 613, 625.15, 625.65, 137/624.11; 251/129.11, 129.04, 30.01, 251/40; 4/305, 304, 302, 314
See application file for complete search history.

(56) References Cited

U.S. PATENT DOCUMENTS 3,696,954 A    10/1972 Weisker et al.
3,831,621 A    8/1974 Anthony et al.
(Continued)

FOREIGN PATENT DOCUMENTS

EP        1096189 A1    5/2001

*Primary Examiner* — Minh Q Le
(74) *Attorney, Agent, or Firm* — Michael Best & Friedrich LLP

(57) ABSTRACT

A flush valve assembly has a pilot valve and a drive train for selective driving the pilot valve between an open position and a closed position. The drive train has a drive gear coupled to a motor for rotating the drive gear and a valve gear coupled to the pilot valve and intermeshing with the drive gear. At least one of the drive gear and the valve gear have a flag extending outwardly therefrom. A sensor positioned to detect the flag and establish a rotational position of the drive gear and the valve gear to thereby establish an opened or closed position of the pilot valve.

17 Claims, 10 Drawing Sheets

Related U.S. Application Data application No. 15/715,640, filed on Sep. 26, 2017, now abandoned.

(60) Provisional application No. 62/399,807, filed on Sep. 26, 2016.

(51) Int. Cl.
  *F16K 31/385* (2006.01)
  *F16K 31/40* (2006.01)
  *F16K 21/12* (2006.01)

(56) References Cited

U.S. PATENT DOCUMENTS

| | | | |
|---|---|---|---|
| 3,834,416 A | 9/1974 | Parkison | |
| 4,420,811 A | 12/1983 | Tarnay et al. | |
| 4,501,297 A | 2/1985 | Baker | |
| 4,611,757 A | 9/1986 | Saether | |
| 4,700,885 A | 10/1987 | Knebel | |
| 4,793,588 A | 12/1988 | Laverty, Jr. | |
| 4,821,765 A | 4/1989 | Iqbal et al. | |
| 5,022,429 A | 6/1991 | Rollini et al. | |
| 5,169,118 A | 12/1992 | Whiteside | |
| 5,174,324 A | 12/1992 | Chrysler | |
| 5,223,822 A * | 6/1993 | Stommes | F16K 37/0008 116/277 |
| 5,244,179 A | 9/1993 | Wilson | |
| 5,411,241 A | 5/1995 | Nilsson et al. | |
| 5,417,083 A | 5/1995 | Eber | |
| RE35,545 E | 7/1997 | Chrysler | |
| 5,681,028 A | 10/1997 | Cook et al. | |
| 5,868,311 A | 2/1999 | Cretu-Petra | |
| 5,918,626 A | 7/1999 | Strong et al. | |
| 6,000,674 A | 12/1999 | Cheng | |
| 6,044,791 A * | 4/2000 | LaMarca | F16K 37/0058 116/277 |
| 6,056,201 A | 5/2000 | Ta | |
| 6,209,581 B1 | 4/2001 | Gyozo | |
| 6,341,731 B1 | 1/2002 | Knapp | |
| 6,349,921 B1 | 2/2002 | Jahrling | |
| 6,457,697 B1 | 10/2002 | Kolze | |
| 6,634,380 B2 | 10/2003 | Bartkus et al. | |
| 6,676,024 B1 | 1/2004 | McNerney et al. | |
| 6,820,647 B1 * | 11/2004 | Grecco | F16K 31/041 137/137 |
| 6,840,496 B2 | 1/2005 | Maercovich et al. | |
| 6,845,524 B2 | 1/2005 | Hwang | |
| 6,845,961 B2 | 1/2005 | Maercovich et al. | |
| 6,854,658 B1 | 2/2005 | Houghton et al. | |
| 6,959,731 B2 | 11/2005 | Bartkus et al. | |
| 7,325,747 B2 | 2/2008 | Jonte | |
| 7,373,950 B2 | 5/2008 | Huang | |
| 7,458,520 B2 | 12/2008 | Belz et al. | |
| 7,510,166 B2 | 3/2009 | Maercovich et al. | |
| 7,584,898 B2 | 9/2009 | Schmitt et al. | |
| 7,624,757 B2 | 12/2009 | Schmitt | |
| 7,631,505 B2 | 12/2009 | Seitz et al. | |
| 7,669,776 B2 | 3/2010 | Beck et al. | |
| 7,717,131 B2 | 5/2010 | Creswell et al. | |
| 7,726,338 B2 | 6/2010 | Clasen et al. | |
| 7,802,733 B2 | 9/2010 | Schmitt | |
| 7,946,504 B2 | 5/2011 | Shapira et al. | |
| 8,087,636 B2 | 1/2012 | Maercovich et al. | |
| 8,091,856 B2 | 1/2012 | Maercovich et al. | |
| 8,375,990 B2 | 2/2013 | Veros | |
| 8,485,496 B2 | 7/2013 | Johnson | |
| 8,585,009 B2 | 11/2013 | Zhu et al. | |
| 8,596,606 B2 | 12/2013 | Maercovich | |
| 8,714,516 B2 | 5/2014 | Maercovich et al. | |
| 8,739,829 B2 | 6/2014 | Maercovich et al. | |
| 9,340,959 B2 | 5/2016 | Peel | |
| 9,366,015 B2 | 6/2016 | Peel | |
| 9,574,336 B1 | 2/2017 | Maercovich | |
| 9,594,383 B2 | 3/2017 | Peel | |
| 9,644,757 B2 | 5/2017 | Peel et al. | |
| 9,650,770 B2 | 5/2017 | Peel | |
| 9,689,149 B2 | 6/2017 | Peel | |
| 9,803,759 B2 | 10/2017 | Bachofer | |
| 9,850,644 B1 | 12/2017 | Huang | |
| 2003/0088338 A1 | 5/2003 | Phillips et al. | |
| 2003/0178591 A1 | 9/2003 | Hwang et al. | |
| 2004/0193326 A1 | 9/2004 | Phillips et al. | |
| 2007/0068583 A1 | 3/2007 | Johnson et al. | |
| 2012/0248353 A1 * | 10/2012 | Furukawa | F02D 9/1015 251/129.01 |
| 2013/0075483 A1 | 3/2013 | Marty et al. | |
| 2014/0345729 A1 | 11/2014 | Chang | |
| 2014/0359935 A1 | 12/2014 | Veros et al. | |
| 2015/0168960 A1 | 6/2015 | Huck et al. | |
| 2015/0233483 A1 | 8/2015 | Bachofer | |
| 2016/0186867 A1 | 6/2016 | Maercovich | |
| 2016/0252915 A1 | 9/2016 | Peel | |
| 2016/0333556 A1 | 11/2016 | Veros et al. | |
| 2017/0152961 A1 | 6/2017 | Peel | |
| 2017/0219114 A1 | 8/2017 | Peel et al. | |
| 2017/0298608 A1 | 10/2017 | Maercovich | |
| 2017/0321809 A1 | 11/2017 | Hashimoto et al. | |
| 2017/0321811 A1 | 11/2017 | Hashimoto et al. | |
| 2017/0322565 A1 | 11/2017 | Hashimoto et al. | |
| 2018/0073227 A1 | 3/2018 | Peel | |
| 2018/0241282 A1 * | 8/2018 | Niekamp | H02K 7/116 |

\* cited by examiner

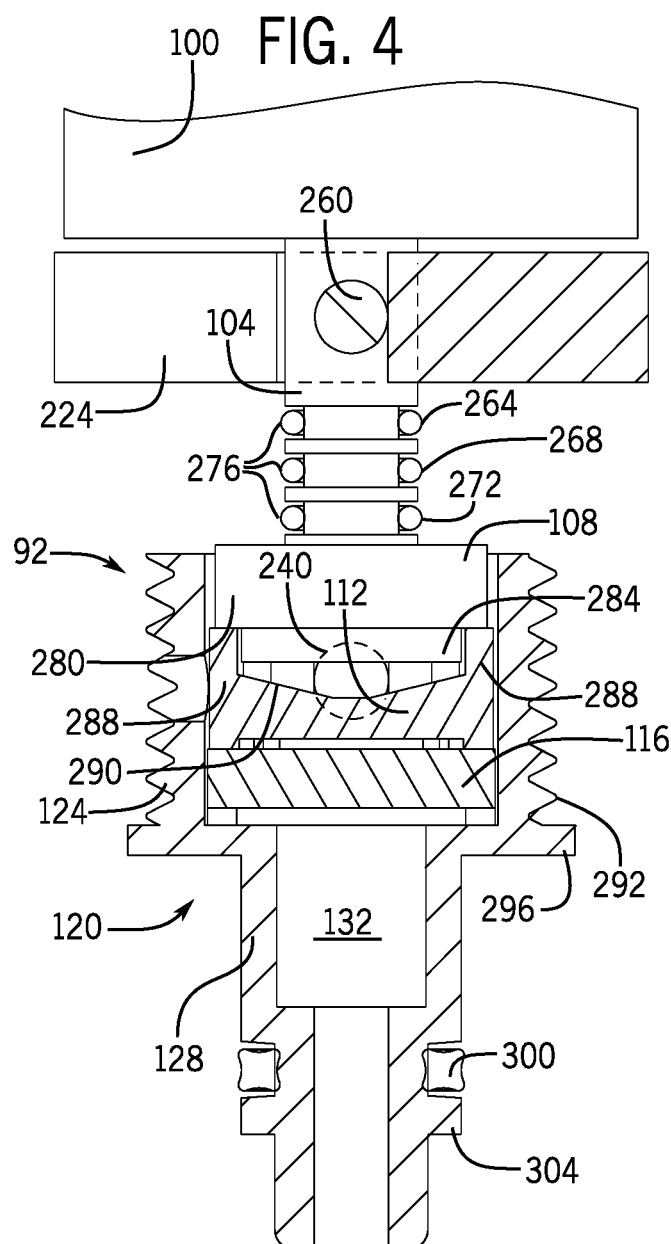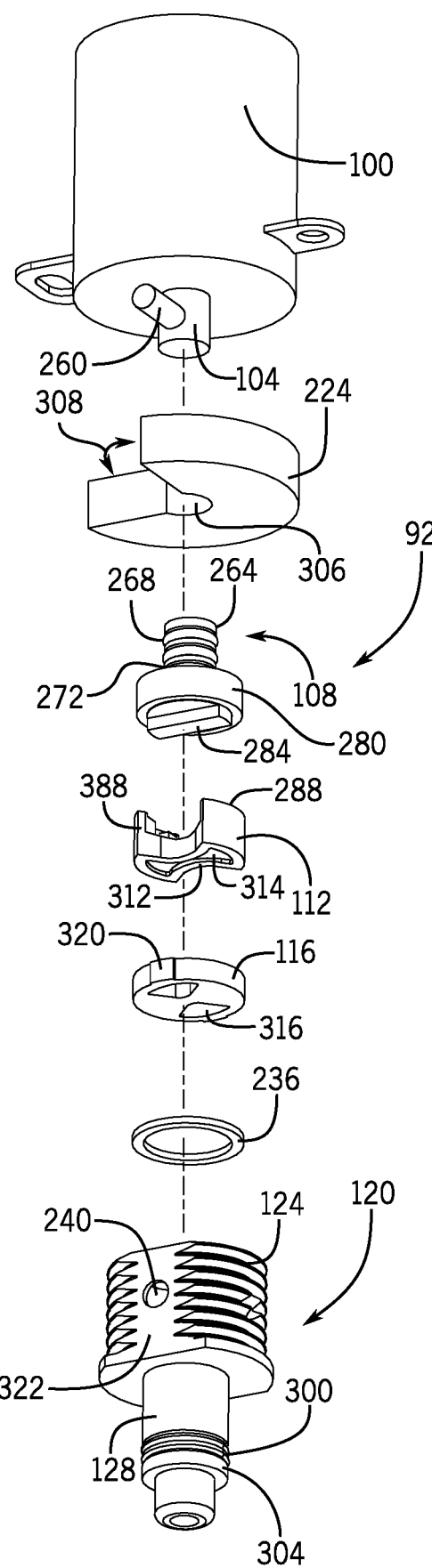

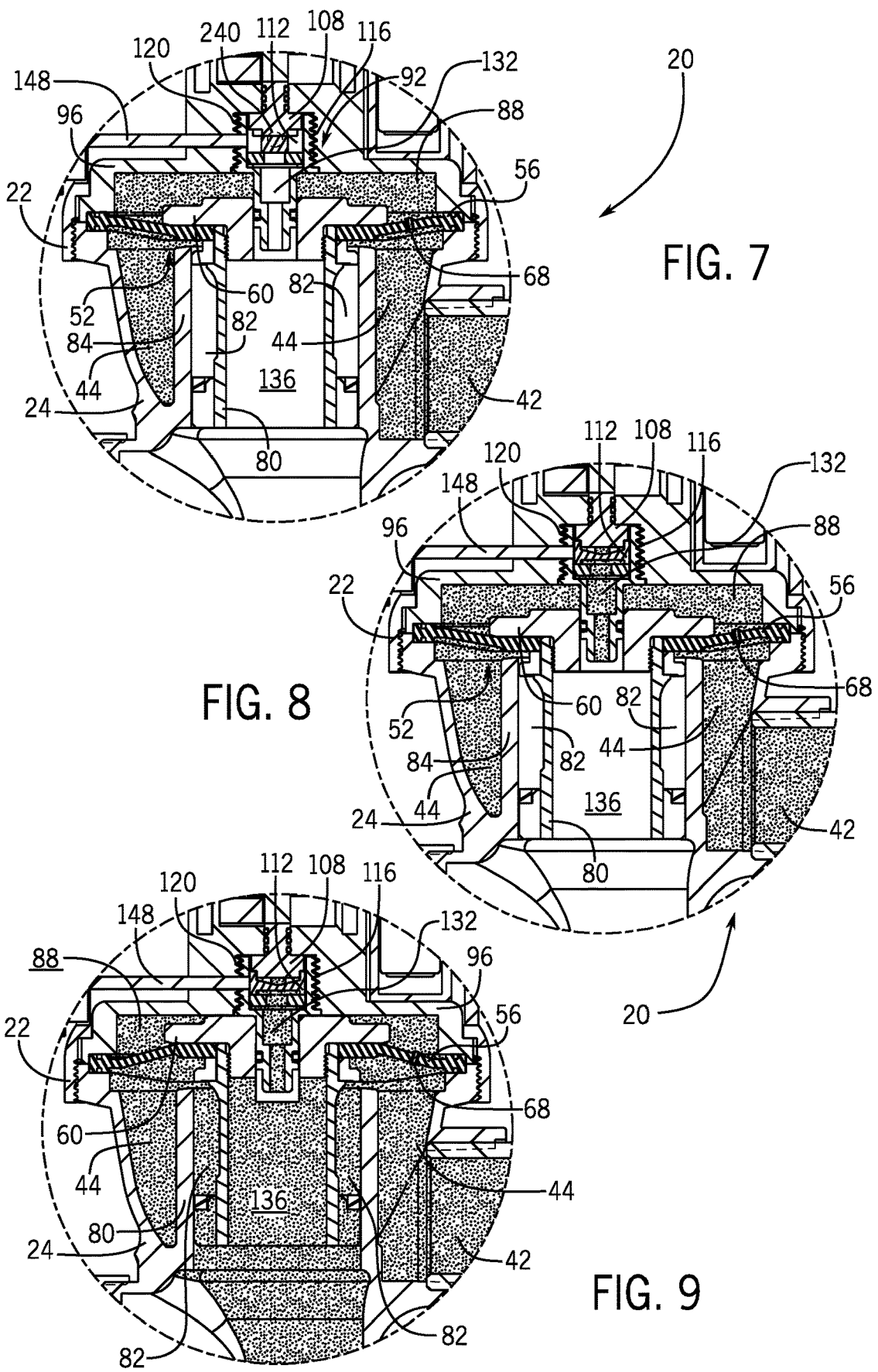

SENSING MECHANISM FOR VALVE OPERATION

CROSS-REFERENCE TO RELATED APPLICATIONS

This application is a continuation-in-part of U.S. patent application Ser. No. 15/714,405 filed on Sep. 25, 2017 and is a continuation-in-part of U.S. patent application Ser. No. 15/715,640 filed on Sep. 26, 2017 both of which claim the benefit of U.S. Provisional Application No. 62/399,807 filed on Sep. 26, 2016, the contents of each are incorporated by reference for all purposes as if set forth in their entirety herein.

STATEMENT OF FEDERALLY SPONSORED RESEARCH OR DEVELOPMENT

Not applicable.

FIELD OF INVENTION

This disclosure relates to a sensing mechanism for valve operation, which allows the actuation of a flush cycle.

BACKGROUND

Manual flush valves for use in urinals, water closets, and toilets are well known in the art. Two common types of flush valves are diaphragm flush valves and piston flush valves. Diaphragm flush valves typically include a fluid inlet and a fluid outlet separated by a diaphragm that selectively prevents fluid from flowing from the fluid inlet to the fluid outlet. The diaphragm of a flush valve selectively prevents fluid from flowing from the fluid inlet to the fluid outlet by being disposed on a valve seat of the fluid outlet. The diaphragm of the flush valve includes a relief valve which selectively allows fluid to pass from the fluid inlet to the fluid outlet. The relief valve commonly features a valve stem that extends downward into the fluid outlet. The valve stem interfaces with a plunger connected to a manual lever arm. The manual lever arm is actuated by a user which pushes the plunger into contact with the valve stem. The contact of the plunger with the valve stem laterally displaces the valve stem which causes the relief valve to slightly open fluid communication between the fluid inlet and the fluid outlet. The slight opening in fluid communication caused by the displacement of the valve stem reduces pressure pressing the diaphragm onto the valve seat which allows the diaphragm to unseat from the valve seat. The unseating of the diaphragm from the valve seat allows additional fluid to flow from the fluid inlet to the fluid outlet. When the user releases the manual lever arm, the plunger returns to its original position. The valve stem returns to its original position when it is not being actuated by the plunger, and when the valve stem is in its original position, the relief valve is closed. Fluid pressure builds on the diaphragm with the relief valve closed. The increase in pressure on the diaphragm due to the closing of the relief valve presses the diaphragm onto the valve seat. Fluid communication between the inlet and the outlet is thereby closed with the diaphragm disposed on the valve seat and the relief valve closed.

Automated flush valves are also well known in the art. Automated flush valves commonly rely on sensors that detect the presence of a user in order to initiate a flush as opposed to a manual lever arm that requires actuation by a user. Automated flush valves have similar internal structures to manual flush valves. As noted with manual diaphragm flush valves, automated flush valves include a fluid inlet and a fluid outlet separated by a diaphragm that selectively prevents fluid from flowing from the fluid inlet to the fluid outlet. The diaphragm of the flush valve selectively prevents fluid from flowing from the fluid inlet to the fluid outlet by being disposed on a valve seat of the fluid outlet. The diaphragm of a flush valve includes a relief valve which selectively allows fluid to pass from the fluid inlet to the fluid outlet. The relief valve commonly features a valve stem that extends downward into the fluid outlet. The valve stem interfaces with a plunger connected to an automated actuation mechanism. The automated actuation mechanism is configured to push the plunger into contact with the valve stem. The automated actuation mechanism can be a motor coupled to a gear train, a solenoid, or other automated actuation mechanisms. The contact of the plunger with the valve stem laterally displaces the valve stem which causes the relief valve to slightly open fluid communication between the fluid inlet and the fluid outlet. The slight opening in fluid communication caused by the displacement of the valve stem reduces pressure pressing the diaphragm onto the valve seat which allows the diaphragm to unseat from the valve seat. The unseating of the diaphragm from the valve seat allows additional fluid to flow from the fluid inlet to the fluid outlet. When the automated actuation mechanism releases from contact with the plunger, the plunger returns to its original position. The valve stem returns to its original position when it is not being actuated by the plunger, and when the valve stem is in its original position, the relief valve is closed. Fluid pressure builds on the diaphragm with the relief valve closed. The increase in pressure on the diaphragm due to the closing of the relief valve presses the diaphragm onto the valve seat. Fluid communication between the inlet and the outlet is thereby closed with the diaphragm disposed on the valve seat and the relief valve closed.

The actuation of the valve stem by the plunger causes the valve stem to be at an angle with respect to the valve seat. The angle of the valve stem selectively opens the relief valve by tilting the relief valve at an angle relative to the valve seat. The selective opening of the relief valve is unpredictable due to variations in pressure applied to the diaphragm in addition to the variation in the actuation by a user or an automated actuation mechanism. The unpredictability of the opening causes control and precision problems. The amount of fluid flowing through the opening is correlated to the size of the opening in the relief valve. The amount of fluid flowing through the flush valve is difficult to control due to the unpredictability of the opening in the relief valve. The timing of a flush cycle is also correlated to the size of the opening allowing water to pass through the relief valve. The unpredictability of the opening in the relief valve also makes the timing of a flush cycle difficult to control.

It is therefore desirable for a flush valve to more precisely control the opening in the relief valve and improve durability of the components in the flush valve.

SUMMARY OF THE INVENTION

Proposed herein is an alternative design for a flush valve. The proposed design may be a retrofit design to replace an existing flush valve. The proposed design may also be a stand-alone unit or employ any other installation methods. The proposed design features an alternative flush valve that can utilize an alternative relief valve that allows for precise control of the opening of the relief valve, increases durability of the components in the flush valve, and removes components from the fluid outlet flow path.

According to one aspect, a flush valve assembly is provided. The flush valve assembly comprises a manifold defining a fluid passageway between a fluid inlet and a fluid outlet. A motor is connected to the manifold and coupled to a driving gear, the driving gear having a flag extending outwardly from a central body of the driving gear. A sensor is positioned to receive at least a portion of the flag in a gap of the sensor. A valve gear is positioned to contact the driving gear which drives the valve gear and this valve gear is coupled to a valve shaft extending from a valve cartridge received in the manifold. The valve cartridge is connected to the fluid inlet of the manifold and the valve shaft controls a rotational position of a valve element in the valve cartridge between an open position and a closed position to regulate fluid flow. Rotational motion from the motor is transferred through the driving gear, the valve gear, and the valve shaft to rotate the valve cartridge between the open position and the closed position. In the open position, the flag is positioned in the gap of the sensor such that the sensor indicates the valve cartridge is in an open position, and in the closed position the flag is positioned outside of the gap of the sensor such that the sensor indicates the valve cartridge is in the closed position.

In some forms, the motor may generate rotational motion in a first direction to place the valve cartridge in the open position and the motor may generate rotational motion in a second direction opposite the first direction to place the valve cartridge in the closed position. The motor may comprise a planetary metal gearbox. The motor may be a direct current (DC) motor, and the motor may comprise at least a three-hundred to one (300:1) gear ratio.

In some forms, the driving gear and the valve gear may each be wedge gears and the valve cartridge may a quarter-turn valve.

In some forms, the sensor may be an optical sensor, and when the flag is positioned in the gap of the sensor, the flag may interrupt the optical sensor to indicate a position of the driving gear correlated to the open position of the valve cartridge.

In some forms, the flush valve assembly may further comprise a controller connected to the sensor and the motor. The controller may be configured to execute a flush cycle including the steps of: instructing the motor to initiate rotational motion in a first direction; identifying the valve cartridge is in the open position when the flag interrupts the sensor to indicate a position of the driving gear correlated to the open position; instructing the motor to stop rotational motion when the open position is identified; instructing the motor to initiate rotational motion in a second direction opposite the first direction after a pre-determined amount of time has elapsed; identifying the valve cartridge is in the closed position when the flag no longer interrupts the sensor to indicate a position of the driving gear correlated to the closed position; and instructing the motor to stop rotational motion when the closed position is identified. The controller may be further connected to a user sensor that detects a presence of a user in proximity to the flush valve assembly followed by an absence of the user, in which the controller is further configured to execute the flush cycle upon detection of the absence of the user following the presence of the user.

In some forms, the flush valve assembly may further comprise a fluid passageway between an assembly inlet and an assembly outlet and a chamber positioned along the fluid passageway. A diaphragm assembly may be positioned in the chamber and bifurcate the chamber into an upper chamber and a lower chamber in which the diaphragm assembly has a diaphragm having a bypass opening that places the upper chamber and the lower chamber in fluid communication with one another. The diaphragm assembly may be selectively received at a diaphragm seat to regulate flow between the assembly inlet and the assembly outlet during a flush cycle by controlling fluid communication between the lower chamber and an outlet chamber that connects the lower chamber to the assembly outlet. In such a configuration, the valve cartridge may be operable as a pilot valve to control a flush cycle by placing the upper chamber and the outlet chamber in selective fluid communication with one another so that, when the valve cartridge is in the open position, a fluid pressure from the upper chamber is released through the manifold to unseat the diaphragm assembly from the diaphragm seat to initiate the flush cycle and, when the valve cartridge is in the closed position, the diaphragm assembly re-seats on the diaphragm seat due to an increased fluid pressure on the diaphragm assembly from the upper chamber to end the flush cycle.

According to another aspect, a flush valve assembly is provided. The flush valve assembly includes a pilot valve and a drive train for selective driving the pilot valve between an open position and a closed position. The drive train includes a motor, a drive gear coupled to the motor for rotating the drive gear, and a valve gear coupled to the pilot valve and intermeshing with the drive gear. At least one of the drive gear and the valve gear have a flag extending outwardly therefrom. A sensor may be positioned to detect the flag and establish a rotational position of the drive gear and the valve gear to thereby establish an opened or closed position of the pilot valve.

According to another aspect, a method for operating a flush valve assembly is provided. The method may comprise the steps of: (a) providing a fluid under pressure from a fluid inlet to a valve cartridge via a fluid passageway in a valve housing; (b) providing a controller connected to a sensor and a motor, the controller configured to execute a flush cycle including the steps of: instructing the motor to initiate rotational motion in a first direction; identifying the valve cartridge is in an open position when a flag interrupts a sensor to indicate a position of a driving gear correlated to the open position; instructing the motor to stop rotational motion when the open position is identified; instructing the motor to initiate rotational motion in a second direction opposite the first direction after a pre-determined amount of time has elapsed; identifying the valve cartridge is in a closed position when the flag no longer interrupts the sensor to indicate a position of the driving gear correlated to the closed position; and instructing the motor to stop rotational motion when the closed positioned is identified.

In some forms, the method may further comprise the steps of: (c) communicating the fluid through a bypass opening in a diaphragm assembly into a chamber, the diaphragm assembly is disposed in the fluid passageway and is movable between an opened position in which the diaphragm assembly is not in contact with a diaphragm valve seat and a closed position in which the diaphragm assembly is in contact with the diaphragm valve seat, wherein the chamber is established by a presence of the diaphragm assembly in the fluid passageway; (d) communicating the fluid in the chamber into the valve cartridge; (e) rotating the valve cartridge into an open position; (f) communicating the fluid through the valve cartridge to a fluid outlet; and (g) translating a diaphragm assembly from a closed position to an open position such that the diaphragm assembly is unseated from a diaphragm valve seat permitting water to pass from the fluid inlet to the fluid outlet.

These and still other advantages of the invention will be apparent from the detailed description and drawings. What follows is merely a description of some preferred embodiments of the present invention. To assess the full scope of the invention, the claims should be looked to as these preferred embodiments are not intended to be the only embodiments within the scope of the claims.

BRIEF DESCRIPTION OF THE DRAWINGS

FIG. 4 is a sectional view of the relief valve taken along line 4-4 of FIG. 2.

FIG. 5 is an exploded view of the relief valve including the motor that drives operation of the valve.

FIG. 7 is a sectional view of an area A-A from FIG. 1 of the flush valve in the closed position.

FIG. 8 is a sectional view of an area A-A of the flush valve just after a relief valve is opened.

FIG. 9 is a sectional view of an area A-A of the flush valve in the open position.

DETAILED DESCRIPTION

Embodiments of the disclosure may be further understood with reference to the figures.

Figure 1:
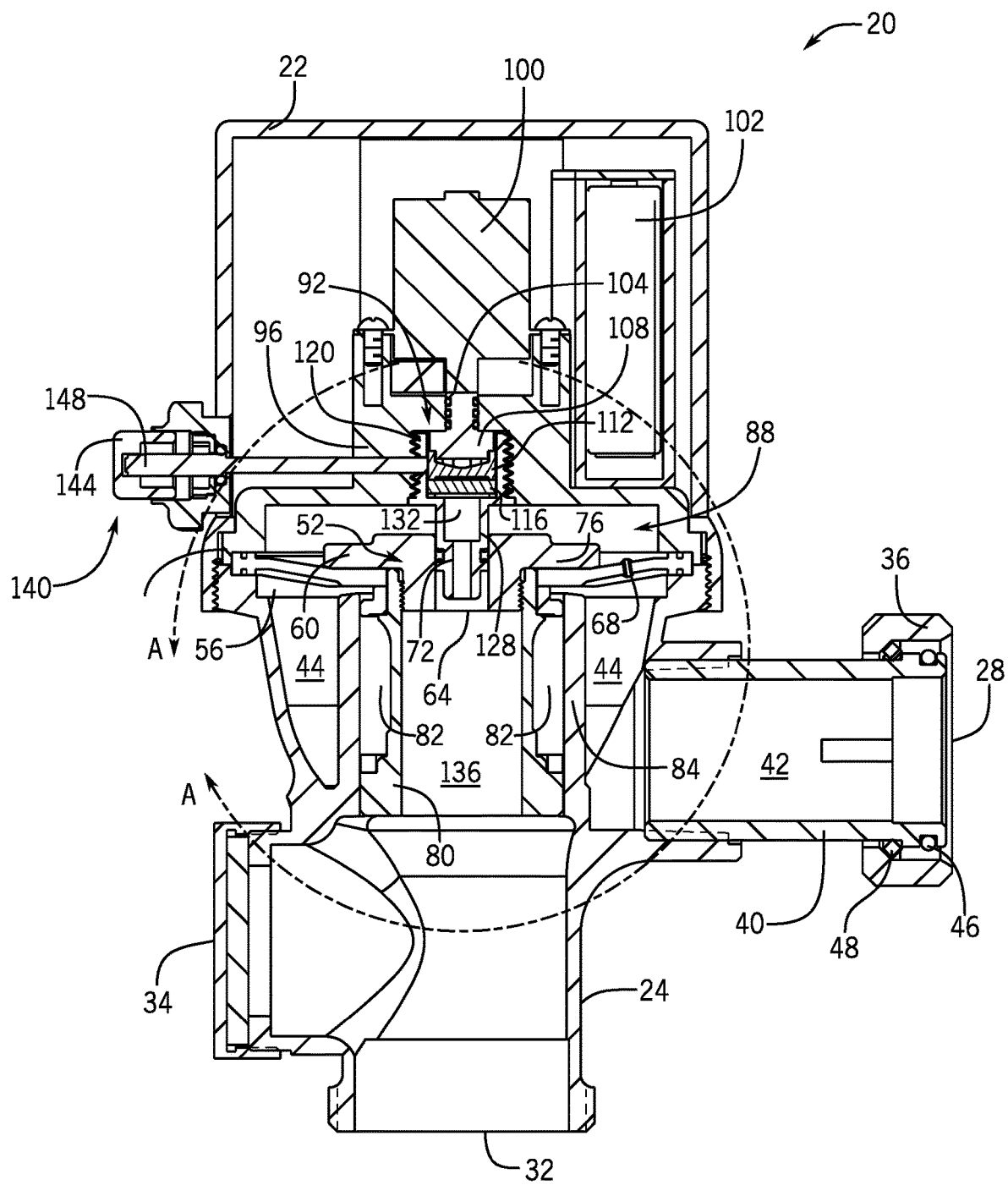
FIG. 1 is a sectional view of the flush valve.

FIG. 1 illustrates one exemplary embodiment of a flush valve 20. The flush valve 20 has a housing that includes an upper housing body 22 and a lower housing body 24 (see FIG. 3) that may be connected such that the upper housing body 22 and lower housing body 24 enclose the flush valve 20. In a non-limiting example, the upper housing body 22 may be threaded into connection with the lower housing body 24. The lower housing body 24 may have an inlet 28, an outlet 32, and a cap 34 over an opening that would traditionally accommodate a mechanical flush lever. The inlet 28 to the lower housing body 24 may connect the lower housing body 24 to a fluid source and provide fluid communication therebetween. The inlet 28 may be secured to a fluid source via a nut 36 that circumferentially extends around an inlet extension 40, an O-ring 46, and a locking ring 48. The inlet extension 40 may be cylindrical in shape and defines a hollow inner chamber 42 for the passage of water. The lower housing body 24 receives the inlet extension 40, which extends perpendicularly outward from the lower housing body 24. The connection of the inlet extension 40 and the lower housing body 24 connects the inner chamber 42 of the inlet extension to a lower chamber 44 within the lower housing body 24.

A diaphragm assembly 52 is disposed within the upper housing body 22 and the lower housing body 24 between the inlet 28 and the outlet 32 and includes a diaphragm 56 and a disc 60. The diaphragm assembly 52 has a diaphragm assembly opening 64 and a bypass opening 68. As illustrated, the diaphragm assembly opening 64 is centrally located on the diaphragm assembly 52 and the bypass opening 68 may be peripherally located on the diaphragm assembly 52; however, they may be otherwise geometrically disposed. The diaphragm 56 and the disc 60 extend circumferentially outward, each defining an outer diameter. The outer diameter of the diaphragm 56 is larger than the outer diameter of the disc 60. The disc 60 is received in a central opening in the diaphragm 56 that aligns with the diaphragm assembly opening 64 in the diaphragm assembly 52. The diaphragm 56 receives a base end 72 of the disc 60 in the central opening in the diaphragm 56 while an outward protrusion 76 of the disc 60 is disposed above a portion of a top surface of the diaphragm 56. The base end 72 of the disc 60 is threadably connected to a diaphragm assembly extension 80. The diaphragm assembly extension 80 is positioned below the diaphragm 56 and the disc 60 and is cylindrical. The diaphragm assembly extension 80 defines a peripheral chamber 82 between an outer wall of the diaphragm assembly extension 80 and an inner wall of a valve seat 84 that extends upward in the housing as a cylindrical column. When the flush valve 20 is in the closed position as is illustrated in FIG. 1, the diaphragm assembly 52 is positioned on a top lip of the valve seat 84 which places the diaphragm assembly 52 in a sealing position between the inlet 28 and the outlet 32. An upper chamber 88 is positioned above the diaphragm assembly 52 and is in fluid communication with the lower chamber 44 via the bypass opening 68 of the diaphragm 56.

Above and downwardly extending into the upper chamber 88, there is a relief valve assembly 92. The relief valve assembly 92 is positioned within and supported by a fixed member 96 that is secured between the upper housing body 22 and lower housing body 24, and an inner surface of the fixed member 96 may also provide a top wall of the upper chamber 88 that provides a fluid boundary that prevents fluid from communicating outside of the fixed member 96. The relief valve assembly 92 includes a motor 100 connected to a power source 102 positioned outside of the fixed member 96. In a non-limiting example, the power source 102 may be one or more batteries. The motor 100 has a shaft 104 that extends out of the motor 100 and connects to a driving member 108. The driving member 108 is connected to a rotatable valve element 112 that is positioned below the driving member 108 and the shaft 104. The rotatable valve element 112 is positioned above a stationary valve element 116 (both of which are in the shape of discs). Illustratively, it should be appreciated that the rotatable valve element 112 may be a moveable valve element and/or a translatable valve element. A relief valve housing 120 has an upper body 124 and a lower body 128, in which the upper body 124 of the relief valve housing 120 receives the driving member 108, the rotatable valve element 112, and the stationary valve element 116. The upper body 124 has a threaded or barbed outer surface which may be fixed within the fixed member 96 to secure the relief valve housing 120 to the fixed member 96. The lower body 128 extends through the upper chamber 88 into the central opening of the disc 60. The relief valve assembly 92 has a chamber 132 that aligns with the opening 64 in the diaphragm assembly 52. The chamber 132 of the relief valve assembly 92 and the opening 64 in the diaphragm assembly 52 align axially with an outlet chamber 136, such that the lower end of the relief valve assembly 92 may be partially positioned within and below the diaphragm assembly extension 80.

In some embodiments, the flush valve 20 may further include a manual actuation assembly 140. The manual actuation assembly 140 can include an actuation interface 144 and an actuation member 148. The actuation interface 144 may extend outside of the upper housing body 22 and may be linked to the actuation member 148. The actuation member 148 may be fixed to the actuation interface 144 and may extend into the housing such that it can contact the rotatable valve element 112 (or some part attached thereto) to provide a manual override. Alternatively, the manual actuation assembly 140 could selectively actuate or open a secondary relief valve element apart from relief valve assembly 92.

Figure 2:
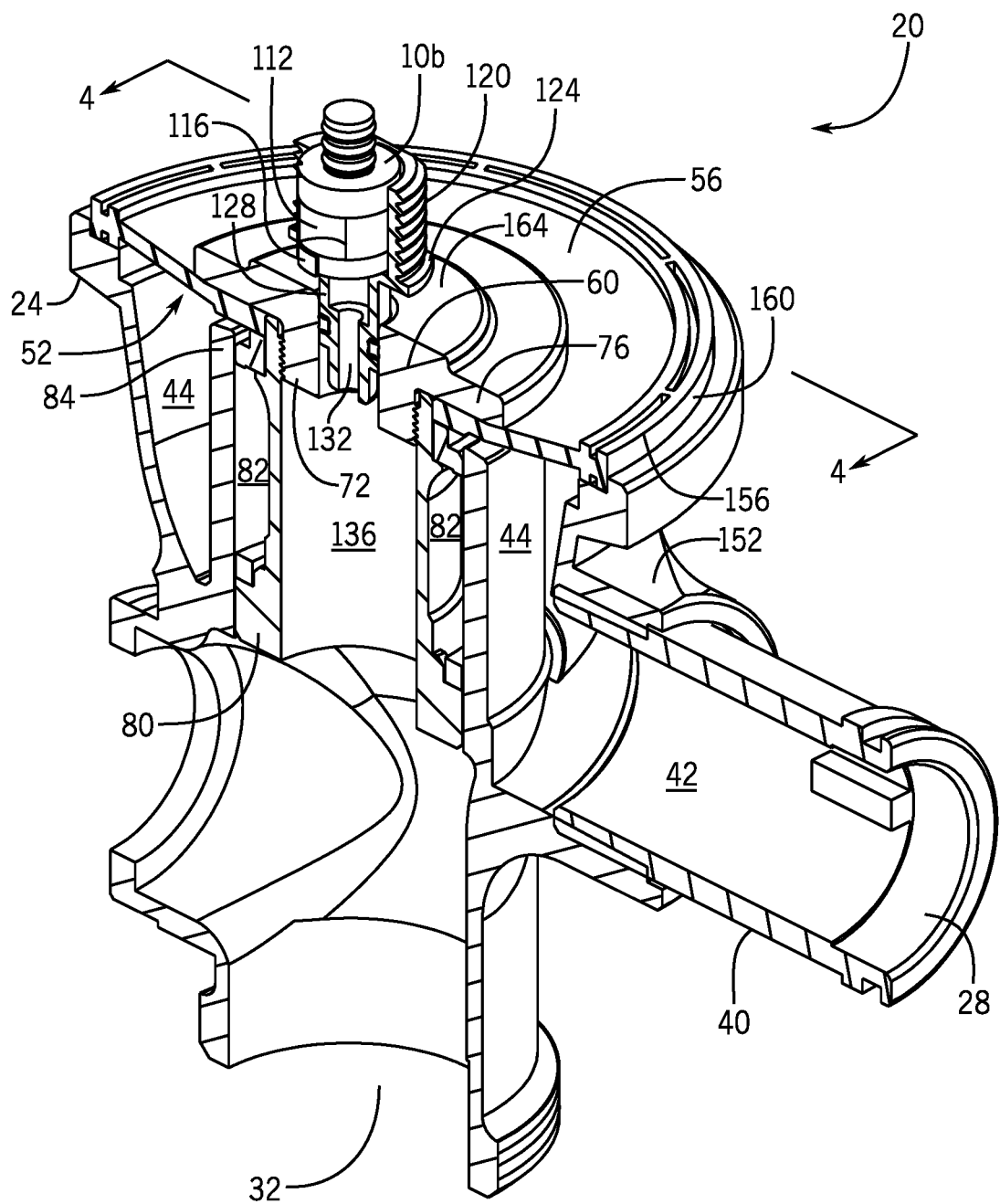
FIG. 2 is a perspective sectional view of a portion of the flush valve excluding the outer cover, rigid member, motor, and gear train.

FIG. 2 shows a sectional perspective view of the flush valve 20 shown in FIG. 1. As best seen in this view, an inlet opening 152 in the housing receives the inlet extension 40. The inlet opening 152 fixes the inlet extension 40 to the lower housing body 24 and provides fluid communication between the inner chamber 42 of the inlet extension 40 and the lower chamber 44 of the lower housing body 24. The lower chamber 44 of the housing circumferentially surrounds the valve seat 84.

An outer diaphragm groove 156 may allow the diaphragm 56 to be secured between the upper housing body 22 and the lower housing body 24. The outer diaphragm groove 156 may be within an outer diaphragm profile 160 which provides an increased thickness around the outer circumference of the diaphragm 56. The outer diaphragm groove 156 may be in the top surface and bottom surface of the outer diaphragm profile 160. In some embodiments, the outer diaphragm groove 156 on the bottom surface of the outer diaphragm profile 160 is secured by the lower housing body 24 and the outer diaphragm groove 156 on the top surface of the outer diaphragm profile 160 may be secured by the fixed member 96 as best depicted in FIG. 1.

A bottom surface of outward protrusion 76 of the disc 60 may be fixed to a top surface of the diaphragm 56. The outward protrusion 76 of the disc 60 has a raised inner area 164 that has a thickness greater than the thickness of the outward protrusion 76. The disc 60 surrounds the lower body 128 of the relief valve housing 120 that is centrally positioned through the diaphragm assembly 52.

Figure 3:
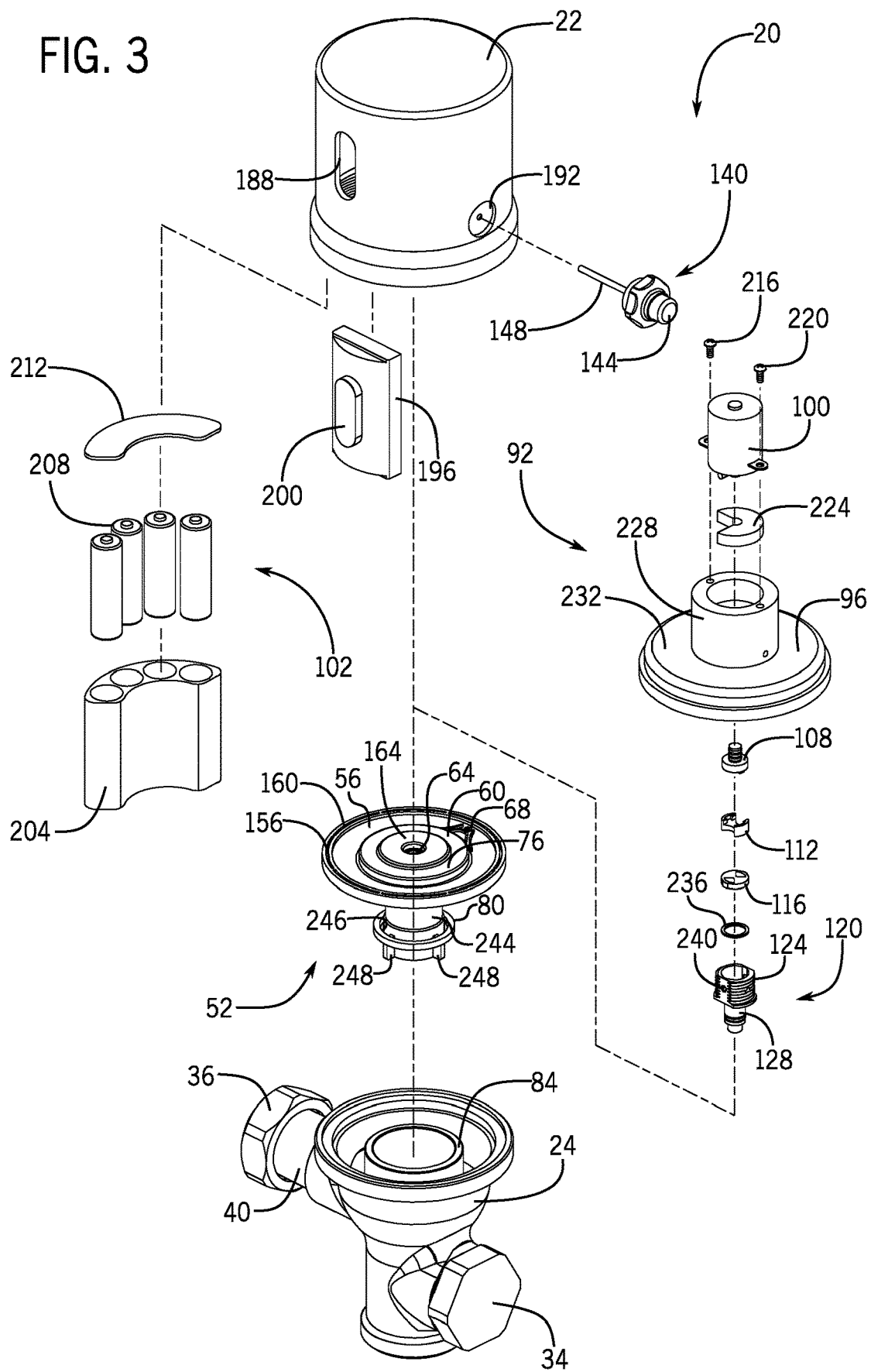
FIG. 3 is an exploded view of the flush valve.

Referring now to FIG. 3, the housing includes an upper housing body 22 and a lower housing body 24. The upper housing body 22 has a sensor opening 188 and a manual actuation opening 192 and each may be any appropriate shape. As shown in a non-limiting example, the sensor opening 188 may be rectangular with rounded edges oriented vertically on the upper housing body 22, and the manual actuation opening 192 may be circular. The sensor opening 188 may be any appropriate shape to receive a sensor 196 that is positioned within the upper housing body 22 or to permit the sensor 196 to sense therethrough. The sensor 196 may have an outward protrusion 200 that may be configured to fit within the sensor opening 188 for purposes of assembly or construction. In the form illustrated, the upper housing body 22 is configured to contain the diaphragm assembly 52, the relief valve assembly 92, and the sensor 196.

The power source 102 is received within the upper housing body 22. The power source 102 may include a battery housing 204, one or more batteries 208, and a battery housing cover 212. The battery housing 204 may have a curved structure that is configured to fit within an inner wall of the upper housing body 22. The battery housing 204 may be configured to contain one or more batteries 208 within one or more battery chambers 206 within the battery housing 204. In some embodiments, the batteries 208 may be arranged vertically within the battery housing 204. The battery housing cover 212 may be configured to close the battery housing 204 with a shape that may match the curved structure of the battery housing 204. A bottom surface of the battery housing cover 212 may contact a top surface of the battery housing 204 and may be secured thereon.

The manual actuation assembly 140 may be received in the manual actuation opening 192 in the upper housing body 22. The actuation interface 144 may be outside of the upper housing body 22 while the actuation member 148 may extend within the upper housing body 22 through the manual actuation opening 192.

The relief valve assembly 92 may be received within the upper housing body 22. The motor 100 may be positioned above a rotational stop 224 that indicates the position of the motor 100. The motor 100 may be secured to the fixed member 96 via screws 216, 220 fixed to a top surface of an upper body 228 of the fixed member 96. The upper body 228 of the fixed member 96 may extend vertically from a lower body 232 of the fixed member 96. The upper body 228 of the fixed member 96 may be cylindrical having a hollow inner chamber configured to receive the driving member 108, the rotatable valve element 112, the stationary valve element 116, an O-ring 236 and the relief valve housing 120. The lower body 232 of the fixed member 96 may extend radially outward from a bottom surface of the upper body 228 of the fixed member 96. The driving member 108 may be positioned above the rotatable valve element 112 that is positioned above the stationary valve element 116. O-ring 236 is received at the bottom of the upper body 124 of the relief valve housing 120 which receives the driving member 108, the rotatable valve element 112, the stationary valve element 116, and the O-ring 236. The upper body 124 of the relief valve housing 120 may have a relief valve inlet 240 positioned on a flat outer surface of the upper body 124 of the relief valve housing 120.

The relief valve assembly 92 is positioned above the diaphragm assembly 52 within the upper housing body 22. The diaphragm assembly extension 80 extends below the diaphragm 56 and features a diaphragm assembly extension upper support 244 and one or more diaphragm assembly extension lower supports 248. A bottom surface of the diaphragm assembly extension upper support 244 is fixed to a top surface of one or more diaphragm assembly extension lower supports 248. The diaphragm assembly extension upper support 244 is cylindrical in shape and wraps around the diaphragm assembly extension 80 while leaving a gap 246 around an outer surface of the diaphragm assembly extension 80. The one or more diaphragm assembly extension lower supports 248 are rectangular and are positioned vertically on the outer surface of the diaphragm assembly extension 80. The one or more diaphragm assembly extension lower supports 248 are spaced radially around the perimeter of the diaphragm assembly extension 80. The one or more diaphragm assembly lower supports 248 may be placed at 90 degree intervals around an outer surface of the diaphragm assembly extension 80.

The diaphragm assembly 52 contacts a top surface of the valve seat 84 and the diaphragm assembly extension 80 extends into the lower housing body 24.

Referring now to FIG. 4, a cross section of the relief valve assembly 92 is shown. The relief valve assembly 92 may be assembled with the shaft 104 of the motor 100 extending through the rotational stop 224. A motor shaft extension 260 is cylindrical in shape and extends perpendicularly outward from the shaft 104 to selectively contact an inner face of the rotational stop 224, depending on the position of the shaft 104 and the rotational stop 224. The shaft 104 is fixed to the driving member 108. In some embodiments, a bottom surface of the shaft 104 may be fixed to a top surface of the driving member 108. In other embodiments, the shaft 104 and the driving member 108 may be connected by a keyed connection, D-shape connection, geared connection, or any other suitable connection between a motor shaft and a driving member. The driving member 108 has O-rings 264, 268, 272 that are positioned between the driving member rings 276. The driving member rings 276 and O-rings 264, 268, 272 are positioned above a driving member body 280 that extends radially outward from the driving member rings 276. The driving member body 280 may be cylindrical in shape and may have a driving member arm 284 that extends from a bottom surface of the driving member body 280.

The driving member arm 284 is received within one or more rotatable valve element walls 288 that extend vertically from the rotatable valve element 112. A top surface of the rotatable valve element 290 has a shape that is concave up thereby recessing away from the driving member arm 284. The relief valve inlet 240 is positioned in a wall of the upper body 124 of the relief valve housing 120 at a vertical position that provides an opening between the driving member arm 284 and the rotatable valve element 112 between the rotatable valve element walls 288. The upper body 124 of the relief valve housing 120 has threads 292 on an outer surface of the upper body 124 of the relief valve housing 120. The threads 292 are positioned above an outer ledge 296 of upper body 124 of relief valve housing 120 that separate the upper body of the relieve valve housing 124 from the lower body 128 of the relief valve housing 120. The lower body 128 of the relief valve housing 120 extends from a lower surface of the outer ledge 296 of upper body 124 of relief valve housing 120 and is received within an O-ring 300. The O-ring 300 is received within a lower body extension 304 that extends outward from an exterior surface of the lower body 128 of the relief valve housing 120. The relief valve chamber 132 may be defined between interior walls of the lower body 128 of the relief valve housing 120.

FIG. 5 shows an exploded view of the relief valve assembly 92. The rotational stop 224 has a central opening 306 that receives the shaft 104. The rotational stop 224 has a cylindrical shape that has a profile opening 308 with a removed angled wedge from the cylindrical shape of the rotational stop 224. A non-limiting example of the wedge angle may be 90 degrees.

The driving member arm 284 is rectangular in shape and has rounded ends. The driving member arm 284 extends along the bottom surface of the driving member body 280 to a length that allows the driving member arm 284 to be received within the rotatable valve element walls 288. The rotatable valve element 112 may have inward curved surfaces 312 that create openings through the rotatable valve element 112 that selectively align with one or more openings 316 in the stationary valve element 116. The inward curved surfaces 312 of the rotatable valve element 112 create an hour-glass profile of the rotatable valve element 112 that match a bottom surface profile 314. The bottom surface profile 314 is cut into the bottom surface of the rotatable valve element 112. The openings 316 in the stationary valve element 116 are wedged-shaped openings that may be cut normally through a top and bottom surface of the stationary valve element 116. The stationary valve element 116 has a cylindrical shape with the openings 316 cut therethrough. The stationary valve element 116 has tabs 320 extending from the outer surface that are configured to secure the stationary valve element 116 in a rotationally fixed position.

The upper body 124 of the relief valve housing 120 has one or more flat faces 322. As shown, the relief valve housing has a two flat faces 322 positioned on opposing sides of the upper body 124 of the relief valve housing 120. Each flat face may feature one or more relief valve inlets 240 that may be circular openings in the flat face 322. The flat faces 322 create a flow path that provides fluid communication between the upper chamber 88 and the relief valve assembly 92 via the one or more relief valve inlets 340.

Figure 6:
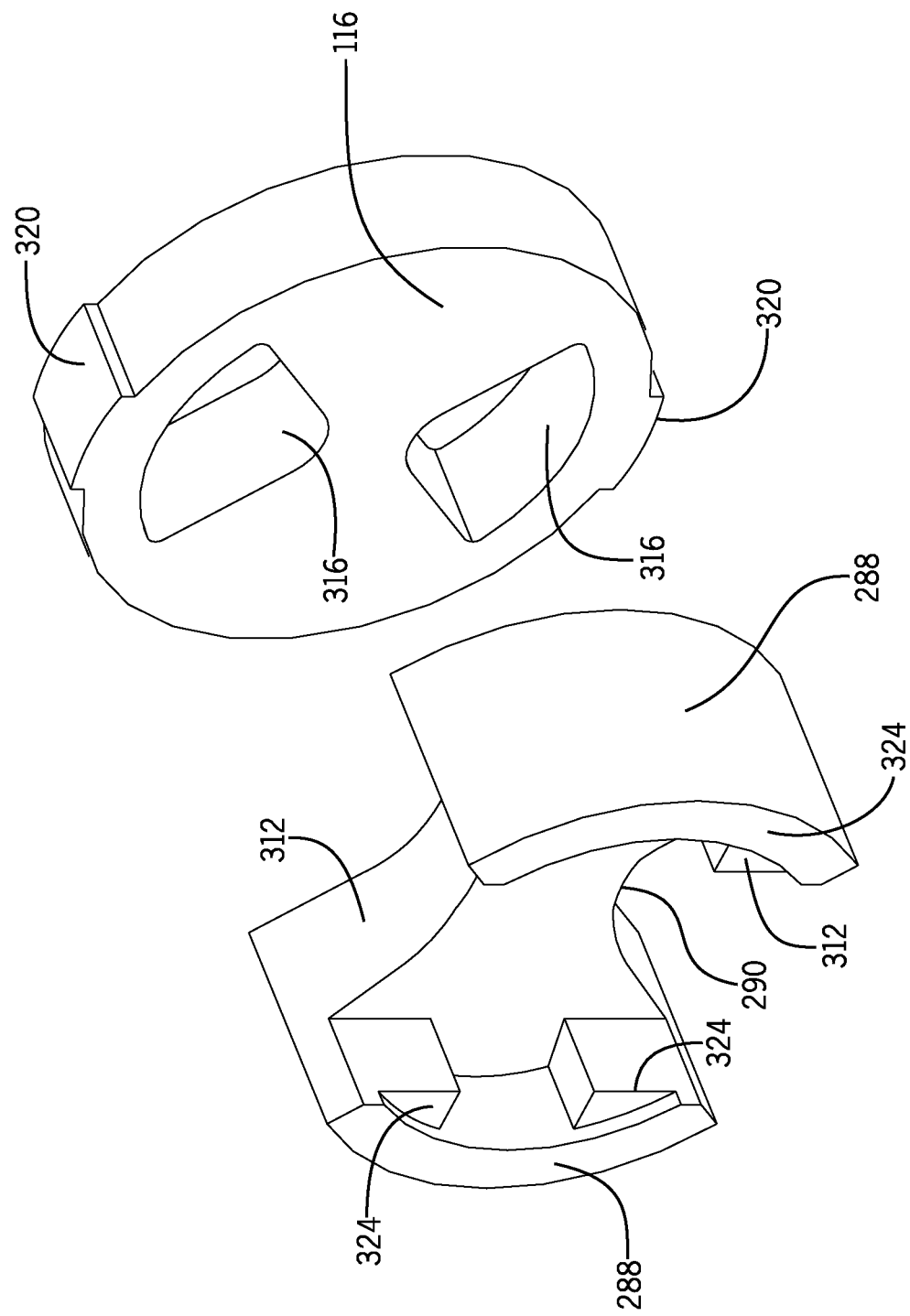
FIG. 6 is a perspective view of the stationary valve member and the rotatable valve member.
Figure 10:
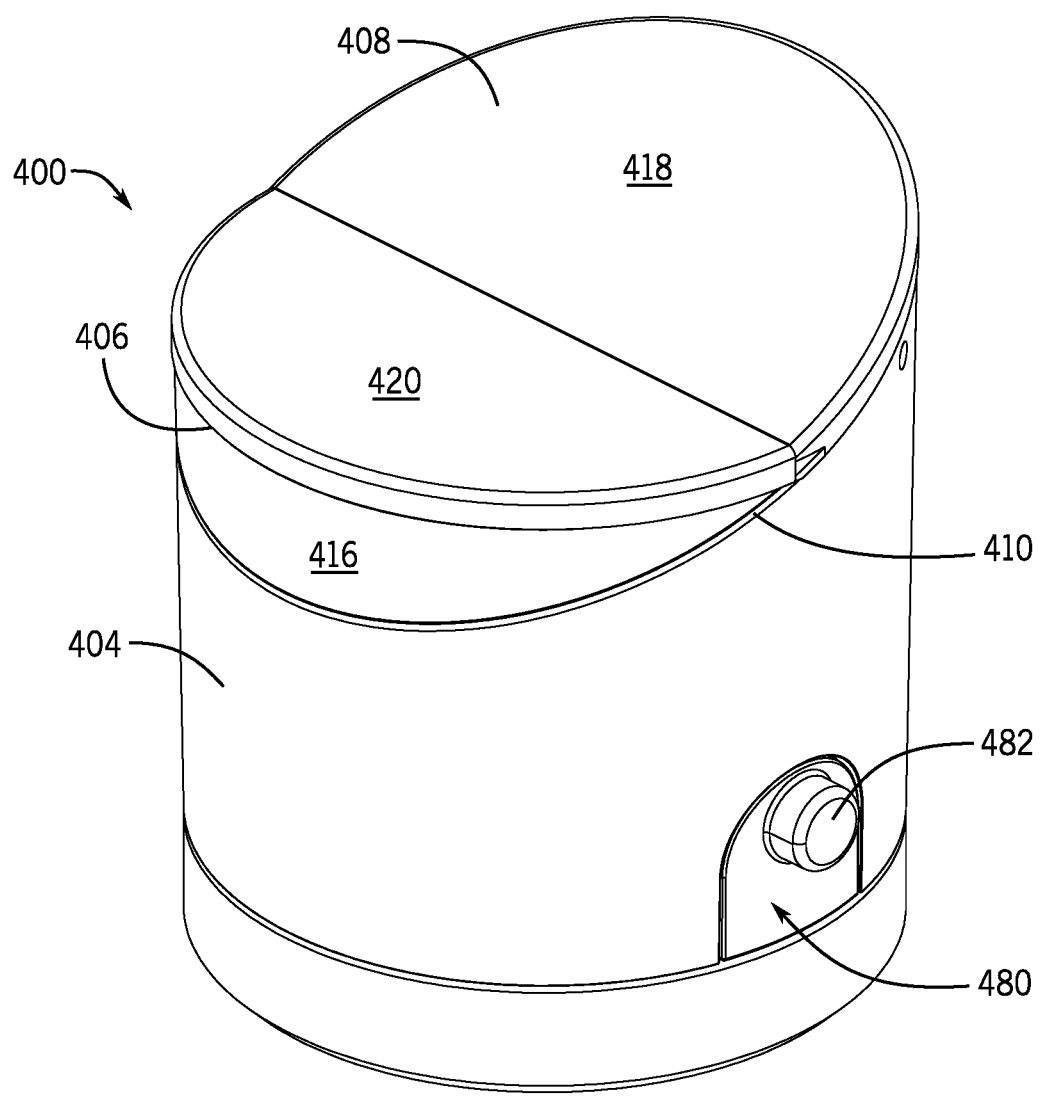
FIG. 10 is a perspective view of a flush valve housing of a flush valve assembly according to another embodiment of the disclosure.
Figure 11:
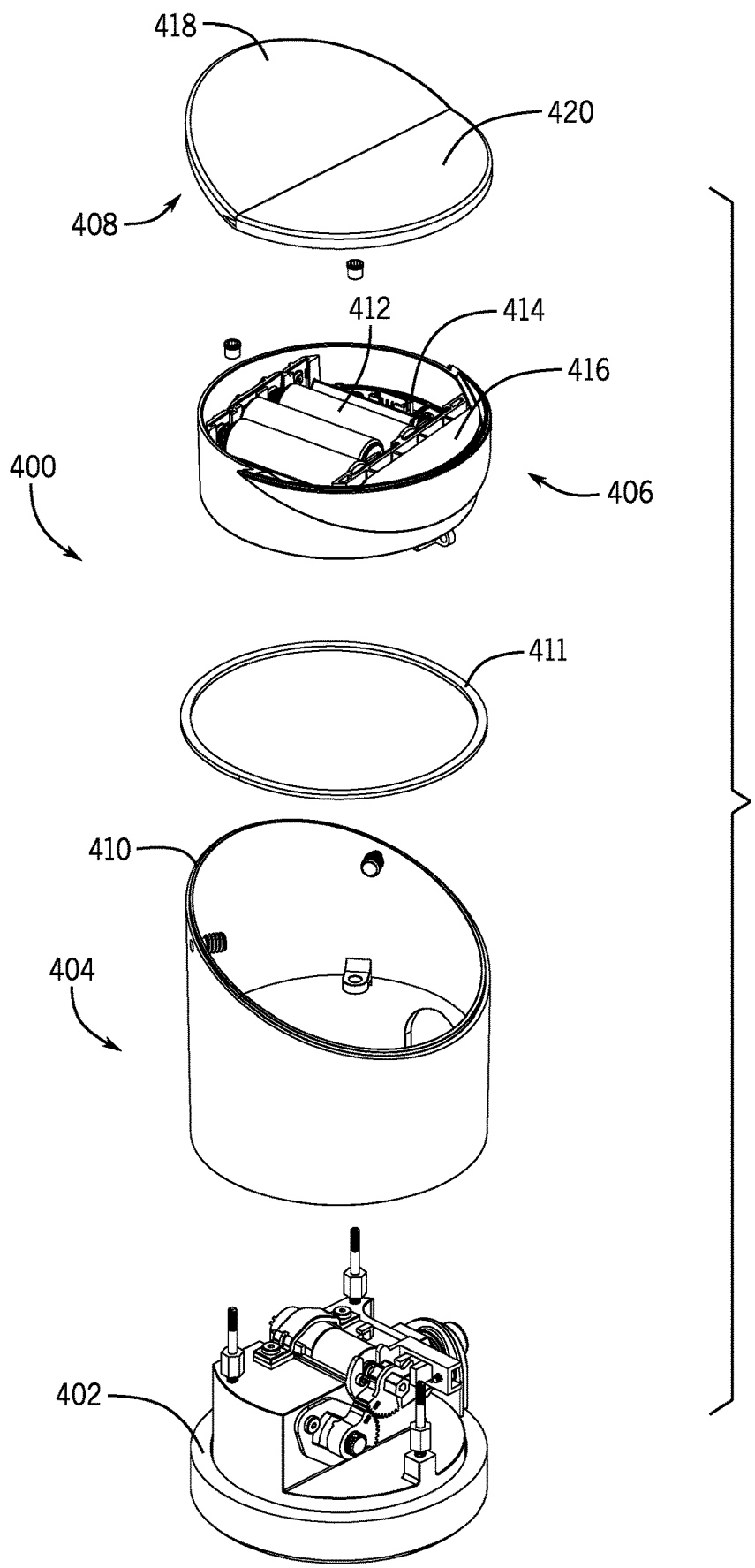
FIG. 11 is an exploded view of a flush valve assembly of FIG. 10.

FIG. 6 shows the rotatable valve element 112 and the stationary valve element 116. The rotatable element 112 has a pair of driving member arm supports 324 that extend vertically from the top surface of the rotatable valve element 290. The driving member arm supports 324 are positioned against the rotatable valve element walls 288 when the rotatable valve element 112 is received in the relief valve housing 120. The driving member arm supports 324 are positioned in order to receive the driving member arm 284 in a gap between the driving member arm supports 324.

Now that the components of the flush valve 20 have been described in detail, their respective functionalities may be appreciated. Referring to FIGS. 4, 5, and 6, the motor 100 may be configured to generate rotational motion that is translated to the shaft 104. The rotational motion of the shaft 104 causes rotational motion of the motor shaft extension 260, which rotates into selective contact with an inner surface of the rotational stop 224 within the profile opening 308. Rotational motion of the shaft 104 translates rotational motion to the driving member 108 and, consequently, the driving member arm 284. The driving member arm 284 received within the driving member arm supports 324 in the rotatable valve element 112 causes rotation of the rotatable valve element 112.

Rotation of the rotatable valve element 112 may change the rotational position of the inward curved surfaces 312 of the rotatable valve element 112, which may selectively move the rotational position of the openings of the rotatable valve element 112. Selective movement of the openings through the rotatable valve element 112 defines a plurality of positions of the relief valve assembly 92. A first position of the relief valve assembly 92 is an open position defined by the openings through the rotatable valve element 112 aligning with the openings 316 in the stationary valve element 116. Alignment of the openings in the rotatable valve element 112 with the openings 316 in the stationary valve element 116 allows fluid communication through the relief valve assembly 92. A second position of the relief valve assembly 92 is a closed positon defined by the openings through the rotatable valve element 112 not aligning with the openings 316 in the stationary valve element 116. In the closed position, the openings 316 in the stationary valve element 116 are covered by rotatable valve element 112. In the closed position, fluid communication is prohibited to pass through the relief valve assembly 92.

Illustratively, the relief valve assembly 92 may include one or more moveable and/or translatable valve elements. The one or more moveable and/or translatable valve elements may be selectively moved or translated with respect to one or more stationary valve elements. Movement of the one or more moveable and/or translatable valve elements selectively provides fluid communication between the chamber 88 and the relief valve chamber 132.

Now with reference to FIGS. 7-9, the initiation of a flush cycle by temporarily actuating the relief valve assembly 92 from the closed position to the opened position is illustrated. This brief opening of the relief valve assembly 92 will cause the entire diaphragm assembly 52 to lift, permitting water to travel from the inlet 28 to the outlet 32.

FIG. 7 shows a detailed area A-A of the flush valve 20 in a closed position with fluid retained in the flush valve 20 and is unable to enter the outlet chamber 136 because the diaphragm assembly 52 remains sealed against the upper lip of the valve seat 84. Fluid provided through the inlet 28 (not shown in FIG. 7, but found in prior figures) into the inner chamber 42 which is in fluid communication with the lower chamber 44. The lower chamber 44 surrounds outside wall the valve seat 84 and is in fluid communication with the chamber 88 via the bypass opening 68 in the diaphragm 56. The bypass opening 68 places the lower chamber 44 in fluid communication with the upper chamber 88. The relief valve inlets 240 extends from the flat faces 322 of the relief valve housing 120 (see FIG. 5). The flat faces 322 of the relief valve housing 120 produce a gap between the flat faces 322 and the fixed member 96. The gap between the one or more flat faces 322 and the fixed member 96 provides fluid communication between the upper chamber 88 and the relief valve assembly 92 via the relief valve inlets 240. In the position illustrated in FIG. 7, the relief valve assembly 92 is in the closed position defined by the openings in the stationary valve element 116 being covered by the rotatable valve element 112 thereby preventing fluid from flowing past the stationary valve element 116.

As mentioned above, the diaphragm assembly 52 is in a closed position while the relief valve assembly 92 is in the closed position. The closed positon of the diaphragm assembly 52 is defined by the diaphragm assembly 52 being received against the valve seat 84 creating a seal therebetween. The diaphragm assembly 52 may be held in a closed position by the force of fluid in the chamber 88, exerting a downward force on the diaphragm 56 and the disc 60, thereby pressing the diaphragm assembly 52 against the valve seat 84.

FIG. 8 shows the area A-A of the flush valve 20 just after the relief valve assembly 92 has been opened to initiate the opening of the flush valve 20, but before water was passed entirely through the relief valve assembly 92 to permit the diaphragm assembly 52 to lift. The open position of the flush valve is achieved when the motor 100 or actuation member 148 selectively rotates the rotatable valve element 112 such that the openings in the rotatable valve element 112 align with the openings in the stationary valve element 116 creating fluid communication through the relief valve assembly 92 such that water may pass from the upper chamber 88 into the outlet chamber 136. Just after the relief valve assembly 92 has been opened, the diaphragm assembly 52 may remain in the closed position. The diaphragm assembly 52 may remain in the closed position just after the relief valve assembly 92 opens because the pressure exerted on the diaphragm assembly 52 temporarily holds it on the valve seat 84 as the pressure has not been relieved through the outlet chamber 136.

FIG. 9 shows the area A-A of the flush valve 20 where the relief valve assembly 92 has remained opened and the diaphragm assembly 52 has lifted such that the flush valve 20 is in the open position. The open position of the flush valve 20 is achieved when the fluid from the upper chamber 88 is allowed to flow through the relief valve chamber 132 and into the outlet chamber 136 for a sufficient duration of time to break the seal at the valve seat 84. Fluid flow through the relief valve chamber 132 into the outlet chamber 136 relieves pressure in chamber 88 exerted on the diaphragm assembly 52. Under this change in pressure, the diaphragm 56 is flexible upward which causes vertical translation of the diaphragm assembly 52 away from the valve seat 84 to break the seal. Vertical translation of the diaphragm assembly 52 away from the valve seat 84 provides direct fluid communication between the lower chamber 44 and the outlet chamber 136 via the peripheral chamber 82. Put another way, with the diaphragm assembly 52 unseated from the valve seat 84, the inlet 28 and the outlet 32 are placed in direct fluid communication with one another past the upper opening in the valve seat 84.

To close the flush valve 20, the motor 100 or the actuation member 148 rotates the rotatable valve element 112 such that the one or more openings in the stationary valve element 116 are covered by the rotatable valve element 112 thereby preventing fluid from flowing past the stationary valve element 116 (i.e., the relief valve assembly 92 is closed). After returning to the closed position, the pressure will rise in upper chamber 88 as fluid communication between upper chamber 88, the relief valve chamber 132, and the outlet chamber 136 are shut off. The increased pressure in upper chamber 88 translate the diaphragm assembly 52 back down into a closed position by pressing the diaphragm assembly 52 against the valve seat 84, as shown in FIG. 7. The closed position of the diaphragm assembly 52 again, at least temporarily, prevents fluid communication between the lower chamber 44, the peripheral chamber 82, and the outlet chamber 136.

The flush valve 20 may be selectively in the open position for a pre-defined or selected period of time and that period of time may define a flush cycle. The period of time may be an appropriate amount of time to generate fluid flow through the flush valve 20 given the fixture on which the valve is received such as a urinal or toilet. A non-limiting example of a period of time range the relief valve assembly 92 may be in an open position for may be 0.5 to 3 seconds which may result in the flush valve to be open from 3 to 10 seconds. The time the relief valve assembly 92 is selectively in an open position may not be the time required to complete a flush, as the flush valve 20 may be in a closed positon while residual fluid may flush.

A flush cycle may be initiated manually or automatically. An automatic flush cycle may occur when the sensor 196 detects a user has approached the flush valve 20 and will actuate the cycle when the identified user has left the flush valve 20. The sensor may communicate control instructions to the motor 100 to selectively rotate the relief valve assembly 92 into the open position in order to initiate a flush cycle. Alternatively, a flush cycle may be initiated manually using the manual actuation assembly 140. A user may use the actuation interface 144 to initiate a flush cycle where the manual actuation assembly 140 may selectively rotate the relief valve assembly 92 into an open position. The manual actuation assembly 142 may selectively rotate the relief valve assembly 92 into an open position in the absence of power.

FIGS. 10-13 illustrate a flush valve assembly 400 according to another embodiment of this disclosure. The flush valve assembly 400 has a manifold 402 that is at least partially received in a flush valve housing 404 that covers the manifold 402. The flush valve housing 404 may be generally cylindrical in shape having angled upper rim 410 that creates a tapered profile of the flush valve housing 404 that creates a space at the front of the flush valve housing 404 to partially receive and connect to an electronics assembly 406 that is received above the manifold 402 and a gasket 411.

The electronics assembly 406 houses a power source 412 (e.g. a battery pack or similar power sources), a controller 414, and a user sensor assembly 416, among other things. The user sensor assembly 416 is positioned at or near the front of the electronics assembly 406 so that when the electronics assembly 406 is connected to the flush valve housing 404, the user sensor assembly 416 faces outwardly towards a user area where a user could be detected. A housing cover 408 covers the top of the electronics assembly 406 and connects to the flush valve housing 404. The housing cover 408 has a front portion 420 that extends to cover the top of the user sensor assembly 416 and a back portion 418 that extends at an angle to meet with the angled upper rim 410 at the back of the flush valve housing 404.

Figure 12:
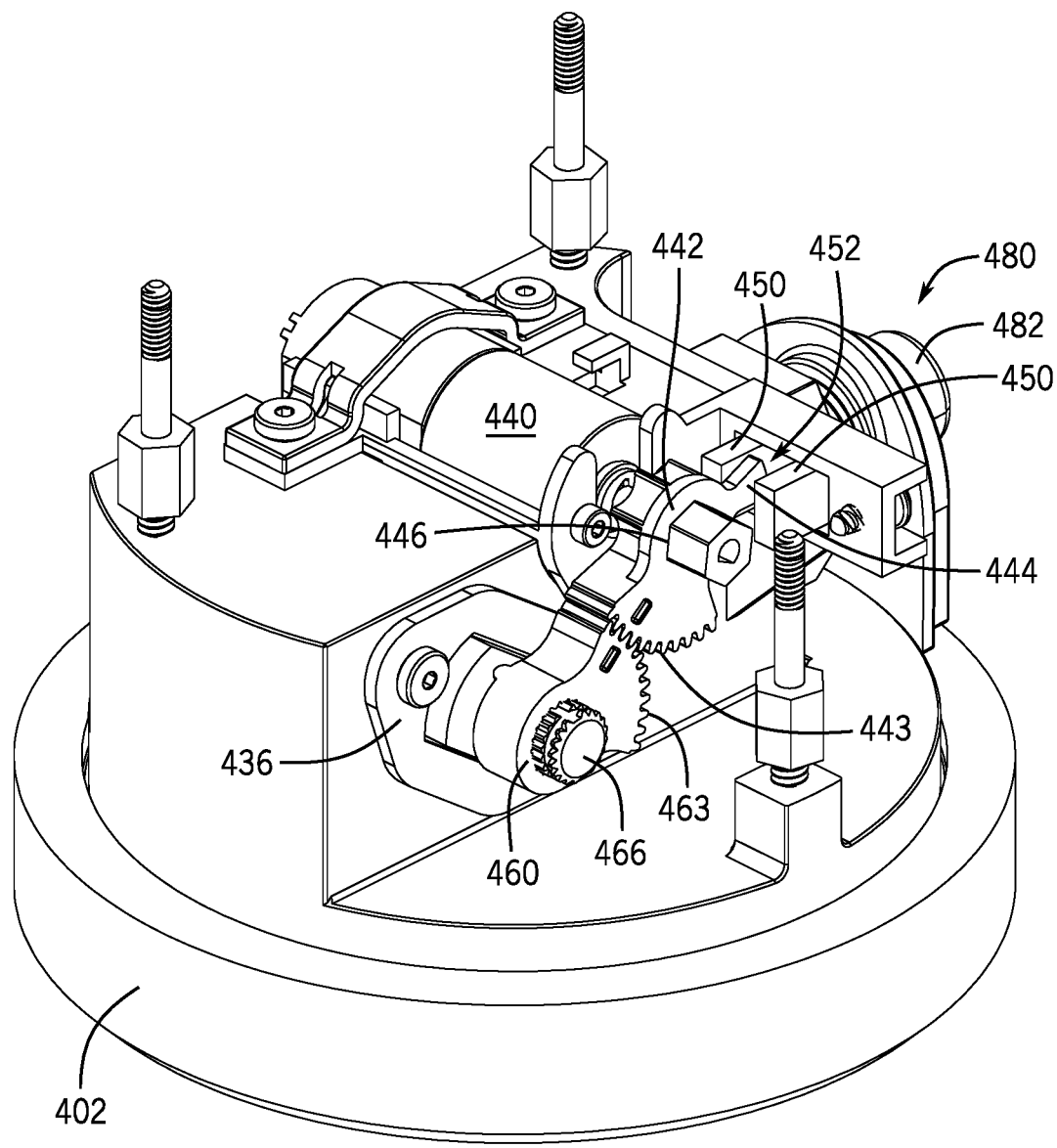
FIG. 12 is a detailed perspective view of a portion of the flush valve assembly of FIG. 10.
Figure 13:
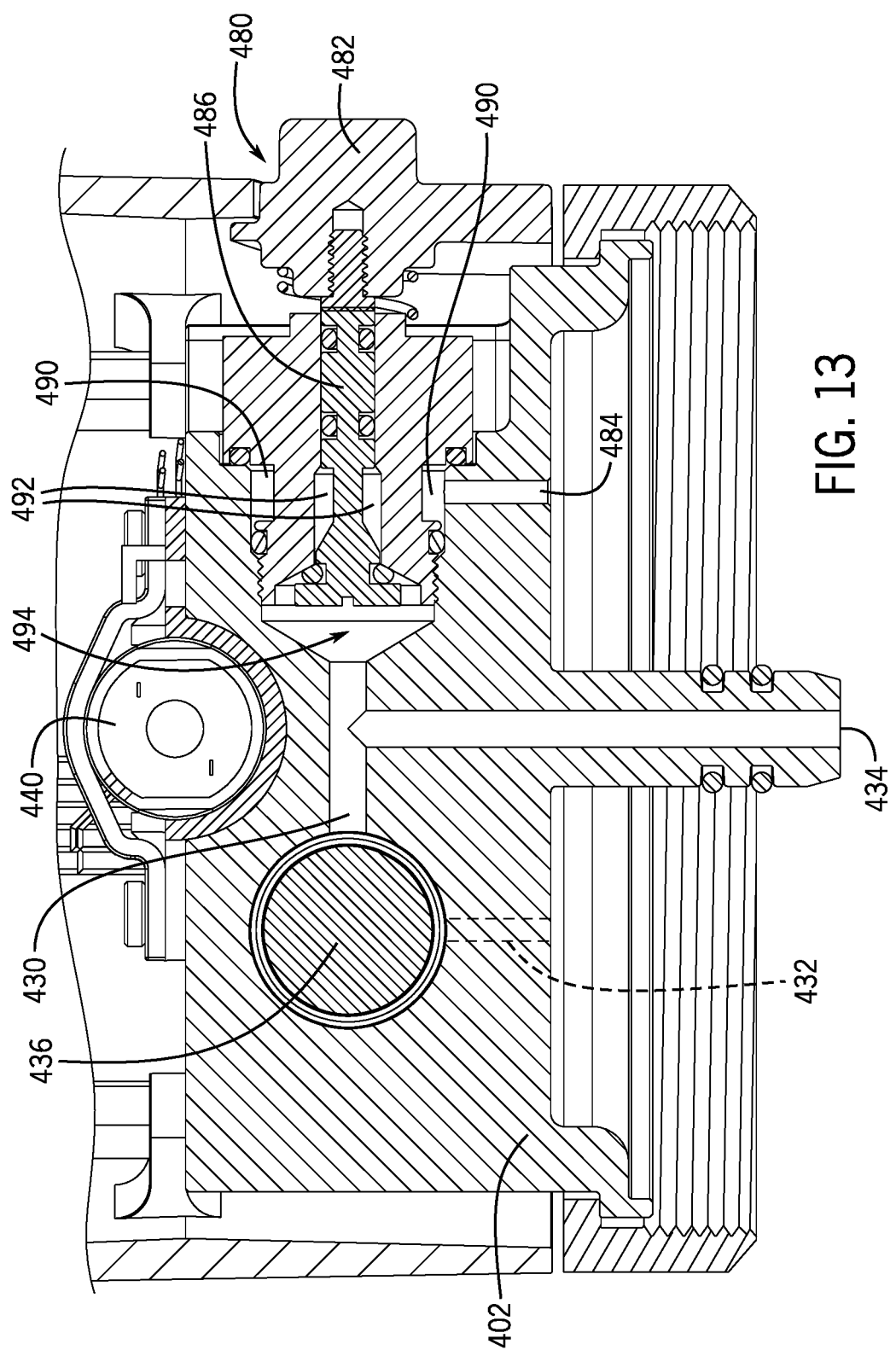
FIG. 13 is a cross-sectional view of a portion of the flush valve assembly of FIG. 10.

FIGS. 12 and 13 more clearly illustrate the manifold 402 and the surrounding structures. The manifold 402 defines a fluid passageway 430 between a fluid inlet 431 and a fluid outlet 434. The fluid inlet 432 in the manifold 402 is connected to an upper chamber, for example the upper chamber 88 described above and provide fluid communication to a valve cartridge 436 received in the manifold 402 that provides selective fluid communication from the fluid inlet 432 to the fluid outlet 434 via the fluid passageway 430. The fluid outlet 434 is centrally positioned in the manifold 402 and extends downwardly away from the rest of the manifold 402. In a non-limiting example, the fluid outlet 434 may be positioned at the end of the lower body 128, if the lower body 128 was removed from the relief valve assembly 92, as described above that extends through the upper chamber 88 into the central opening of the disc 60.

A motor 440 is connected to the manifold 402 and is coupled to a driving gear 442. The motor 440 may be a direct current (DC), reversible motor that may comprise a planetary metal gearbox. In some embodiments, the motor 440 may comprises at least a three-hundred to one (300:1) gear ratio. In other embodiments the motor 440 may comprise between a 100:1 gear ratio and a 500:1 gear ratio. Table 1 below shows non-limiting exemplary specifications for motors that could be used in accordance with this disclosure:

TABLE 1

| Rated Voltage | Operating Voltage | Rated Current | Stall Current | Rated Torque | | Starting Torque | | Rated Speed | No Load Speed |
|---|---|---|---|---|---|---|---|---|---|
| (DC) | (DC) | (mA) | (mA) | oz-in | mNm | oz-in | mNm | (rpm) | (rpm) |
| 6 | 5.4~6.6 | 400 | 1600 | 18 | 127 | 54 | 382 | 35 | 45 |
| 12 | 10.8~13.2 | 250 | 800 | | | | | | |
| 24 | 21.6~26.4 | 100 | 450 | 18 | 127 | 54 | 382 | 45 | 53.5 |

The motor 440 may be coupled to the driving gear 442 via a splined connection enabling the motor 440 to control the rotational motion and position of the driving gear 442. The driving gear 442 may have a flag 444 that extends outwardly from a central body 446 of the driving gear 442, the flag 444 can take any appropriate shape so that the flag 444 can indicate the rotational position of the driving gear 442 via a sensor 450. The driving gear 442 may be shaped as a wedge gear that has teeth 443 positioned radially around ninety (90) degrees of the driving gear 442.

The sensor 450 is positioned adjacent or near the driving gear 442 to receive at least a portion of the flag 444 in a gap 452 of the sensor 450. In a non-limiting embodiment, the sensor 450 can be an optical sensor that emits a beam across the gap 452. When the flag 444 is at least partially positioned in the gap 452 of the sensor 450, the flag 444 can interrupt the beam of the sensor 450 to indicate a position of the driving gear 442, which may be correlated to the open position of the valve cartridge 436. In other embodiments, the interruption of the beam of the sensor 450 can indicate the closed position of the valve cartridge 436.

A valve gear 460 is positioned to contact and intermesh with the driving gear 442 which drives the valve gear 460. The valve gear 460 can take a similar shape to the driving gear 442 such that the valve gear 460 is shaped as a wedge gear that has teeth 463 positioned radially around ninety (90) degrees of the valve gear 460. The valve gear 460 is coupled to a valve shaft 466 via a splined connection, the valve shaft 466 extending from the valve cartridge 436 received in the manifold 402. The valve shaft 466 controls the rotational position of at least one valve element (not shown) in the valve cartridge 436 between an open position and a closed position to regulate fluid flow. Due to the wedged shape of the driving gear 442 and the valve gear 460, the valve cartridge 436 may be operable as a quarter-turn valve.

Although the flag 444 is shown to extend from the driving gear 442, the flag 444 can similarly extend from the valve gear 460 and indicate the rotational position of the valve gear 460 thus indicating either an open or closed position of the valve cartridge as described regarding the flag 444 above. Accordingly, with the flag 444 alternatively positioned on the valve gear 460, the sensor 450 may be positioned adjacent or near the valve gear 460 to be able to operate in a similar manner as described above.

The flush valve assembly 400 provides rotational motion from the motor 440 that is transferred through the driving gear 442, the valve gear 460, and the valve shaft 466 selectively drive the valve cartridge 436 between the open position and the closed position. As described above, the motor 440 is reversible and accordingly can generate rotational motion in a first direction to place the valve cartridge 436 in the open position, and the motor 440 generates rotational motion in a second direction opposite the first direction to place the valve cartridge in the closed position.

In the open position, the flag 444 can be positioned in the gap 452 of the sensor 450 such that the sensor 450 indicates the valve cartridge 436 is in an open position. In the open position, the valve cartridge provides fluid communication between the fluid inlet 432 and the fluid outlet 434 through the valve cartridge 436 and the fluid passageway 430.

In the closed position, the flag 444 can be positioned outside of the gap 452 of the sensor 450 such that the sensor 450 indicates the valve cartridge 436 is in the closed position. In the closed position, the valve cartridge prevents fluid from flowing between the fluid inlet 432 and the fluid outlet 434. In an alternative embodiment, the open position and the closed position can be switched such that the presence of the flag 444 in the gap 452 of the sensor 450 can indicate the closed position and the absence of the flag 444 in the gap 452 can indicate the open position.

The sensor 450 and the motor 440 may be connected to the controller 414 that can be configured to execute a flush cycle including: instructing the motor 440 to initiate rotational motion in a first direction; identifying the valve cartridge 436 is in the open position when the flag 444 interrupts the sensor 450 to indicate a position of the driving gear 442 correlated to the open position; and instructing the motor 440 to stop rotational motion when the open position is identified. These steps can place the flush valve assembly 400 in the open position. Depending on the application, the open position may be desired for a number of pre-determined amounts of time. Some non-limiting examples of these times include: between 0.5 to 3 seconds which may result in the flush valve being open from 3 to 10 seconds. The controller 414 can be configured to continue executing a flush cycle including: instructing the motor 440 to initiate rotational motion in a second direction opposite the first direction after a pre-determined amount of time has elapsed; identifying the valve cartridge 436 is in the closed position when the flag 444 no longer interrupts the sensor 450 to indicate a position of the driving gear 442 correlated to the closed position; and instructing the motor 440 to stop rotational motion when the closed positioned is identified. These later steps show the controller 414 transitioning the flush valve assembly 400 from an open position to a closed position.

The controller 414 can be further connected to the user sensor assembly 416 that detects a presence of a user in proximity to the flush valve assembly 400 followed by an absence of the user, in which the controller 414 is further configured to execute the flush cycle upon detection of the absence of the user following the presence of the user. As such, the flush valve assembly 400 can be operable as a touch-free flush valve.

The flush valve assembly 400 may also have a manual override assembly 480. The manual override assembly 480 has a push button 482 that a user can actuate. The push button 482 is connected to a spring-loaded shaft 486 that can be linearly actuated between an open position and a closed position. The manual override assembly 480 is connected to a secondary fluid inlet 484 in the manifold 402 that may similarly be connected to an upper chamber, for example the upper chamber 88 described above and provide fluid communication to the manual override assembly 480. More specifically, the secondary fluid inlet 484 provides fluid communication to an annular chamber 490 in the manual override assembly that can be axially aligned with the secondary fluid inlet 484. The annular chamber 490 can provide fluid communication into a manual override chamber 492 that is aligned with a manual override outlet 494. The manual override outlet 494 provides fluid communication between the secondary fluid inlet 484 and the fluid outlet 434 via the fluid passageway 430 when the manual override is in the open position.

In some embodiments, the flush valve assembly 400 is operable as a pilot valve for initiating a flush cycle. As such the flush valve assembly 400 can be incorporated into a flush valve 20 as described above. In such a case, the flush valve assembly 400 would replace the components of the flush valve 20 positioned above the upper chamber 88, and incorporate the remainder of the components so that the flush valve assembly 400 can operate as a pilot valve for the flush valve 20. Accordingly, the fluid outlet 434 can align with the opening 64 in the diaphragm assembly 52. The fluid outlet 434 the opening 64 in the diaphragm assembly 52 align axially with the outlet chamber 136, such that the lower end of the flush valve assembly 400 may be partially positioned within and below the diaphragm assembly extension 80 and extend through the upper chamber 88.

The valve cartridge 436 can then be operable as a pilot valve to control a flush cycle by placing the upper chamber 88 and the outlet chamber 136 in selective fluid communication with one another so that, when the valve cartridge 436 is in the open position, a fluid pressure from the upper chamber 88 is released through the manifold 402 to unseat the diaphragm assembly 52 from the diaphragm seat to initiate the flush cycle. When the valve cartridge 436 is in the closed position, the diaphragm assembly 52 re-seats on the diaphragm seat due to an increased fluid pressure on the diaphragm assembly 52 from the upper chamber 88 to end the flush.

According to another embodiment of this disclosure, a method for operating a flush valve assembly is provided. The method comprising the steps of: (a) providing a fluid under pressure from a fluid inlet to a valve cartridge via a fluid passageway in a valve housing; (b) providing a controller connected to a sensor and a motor, the controller configured to execute a flush cycle including the steps of: instructing the motor to initiate rotational motion in a first direction; identifying the valve cartridge is in an open position when a flag interrupts a sensor to indicate a position of a driving gear correlated to the open position; instructing the motor to stop rotational motion when the open position is identified; instructing the motor to initiate rotational motion in a second direction opposite the first direction after a pre-determined amount of time has elapsed; identifying the valve cartridge is in a closed position when the flag no longer interrupts the sensor to indicate a position of the driving gear correlated to the closed position; and instructing the motor to stop rotational motion when the closed positioned is identified.

In some embodiments, the method further comprises the steps of: (c) communicating the fluid through a bypass opening in a diaphragm assembly into a chamber, the diaphragm assembly is disposed in the fluid passageway and is movable between an opened position in which the diaphragm assembly is not in contact with a diaphragm valve seat and a closed position in which the diaphragm assembly is in contact with the diaphragm valve seat, wherein the chamber is established by a presence of the diaphragm assembly in the fluid passageway; (d) communicating the fluid in the chamber into the valve cartridge; (e) rotating the at least one rotatable valve element in the valve cartridge into an open position; (f) communicating the fluid through the valve cartridge to a fluid outlet; and (g) translating a diaphragm assembly from a closed position to an open position such that the diaphragm assembly is unseated from a diaphragm valve seat permitting water to pass from the fluid inlet to the fluid outlet.

It should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. A flush valve assembly comprising:
   a manifold defining a fluid passageway between at least one fluid inlet and a fluid outlet;
   a motor connected to the manifold and coupled to a driving gear, the driving gear having a flag extending outwardly from a central body of the driving gear;
   a sensor positioned to receive at least a portion of the flag in a gap of the sensor;

a valve gear positioned to contact the driving gear which drives the valve gear, the valve gear is coupled to a valve shaft extending from a valve cartridge received in the manifold, the valve cartridge is connected to at least one of the fluid inlets of the manifold, the valve shaft controls a rotational position of at least one valve element in the valve cartridge between an open position and a closed position to regulate fluid flow;

wherein rotational motion from the motor is transferred through the driving gear, the valve gear, and the valve shaft to rotate the valve cartridge between the open position and the closed position, wherein in the open position the flag is positioned in the gap of the sensor such that the sensor indicates the valve cartridge is in an open position, and in the closed position the flag is positioned outside of the gap of the sensor such that the sensor indicates the valve cartridge is in the closed position.

2. The flush valve assembly of claim 1 wherein:

the motor generates rotational motion in a first direction to place the valve cartridge in the open position, and the motor generates rotational motion in a second direction opposite the first direction to place the valve cartridge in the closed position.

3. The flush valve assembly of claim 1 wherein:

the driving gear and the valve gear are each wedge gears and the valve cartridge is a quarter-turn valve.

4. The flush valve assembly of claim 1 wherein:

the sensor is an optical sensor, and when the flag is positioned in the gap of the sensor, the flag interrupts the optical sensor to indicate a position of the driving gear correlated to the open position of the valve cartridge.

5. The flush valve assembly of claim 1 further comprising:

a controller connected to the sensor and the motor, the controller configured to execute a flush cycle including the steps of:

instructing the motor to initiate rotational motion in a first direction;

identifying the valve cartridge is in the open position when the flag interrupts the sensor to indicate a position of the driving gear correlated to the open position;

instructing the motor to stop rotational motion when the open position is identified;

instructing the motor to initiate rotational motion in a second direction opposite the first direction after a pre-determined amount of time has elapsed;

identifying the valve cartridge is in the closed position when the flag no longer interrupts the sensor to indicate a position of the driving gear correlated to the closed position; and instructing the motor to stop rotational motion when the closed position is identified.

6. The flush valve assembly of claim 5 wherein the controller is further connected to a user sensor that detects a presence of a user in proximity to the flush valve assembly followed by an absence of the user, in which the controller is further configured to execute the flush cycle upon detection of the absence of the user following the presence of the user.

7. The flush valve assembly of claim 1 further comprising:

a fluid passageway between an assembly inlet and an assembly outlet;

a chamber positioned along the fluid passageway;

a diaphragm assembly positioned in the chamber and bifurcating the chamber into an upper chamber and a lower chamber in which the diaphragm assembly has a diaphragm having a bypass opening that places the upper chamber and the lower chamber in fluid communication with one another, the diaphragm assembly selectively being received at a diaphragm seat to regulate flow between the assembly inlet and the assembly outlet during a flush cycle by controlling fluid communication between the lower chamber and an outlet chamber that connects the lower chamber to the assembly outlet;

wherein the valve cartridge is operable as a pilot valve to control a flush cycle by placing the upper chamber and the outlet chamber in selective fluid communication with one another so that, when the valve cartridge is in the open position, a fluid pressure from the upper chamber is released through the manifold to unseat the diaphragm assembly from the diaphragm seat to initiate the flush cycle and, when the valve cartridge is in the closed position, the diaphragm assembly re-seats on the diaphragm seat due to an increased fluid pressure on the diaphragm assembly from the upper chamber to end the flush cycle.

8. The flush valve assembly of claim 1 wherein the motor comprises a planetary metal gearbox.

9. The flush valve assembly of claim 1 wherein the motor is a direct current (DC) motor.

10. The flush valve assembly of claim 1 wherein the motor comprises at least a three-hundred to one (300:1) gear ratio.

11. A flush valve assembly comprising:

a pilot valve;

a drive train for selective driving the pilot valve between an open position and a closed position, the drive train comprising:

a motor;

a drive gear coupled to the motor for rotating the drive gear; and a valve gear coupled to the pilot valve and intermeshing with the drive gear;

wherein at least one of the drive gear and the valve gear have a flag extending outwardly therefrom;

a sensor positioned to detect the flag and establish a rotational position of the drive gear and the valve gear to thereby establish an opened or closed position of the pilot valve.

12. The flush valve assembly of claim 11 wherein:

the motor generates rotational motion in a first direction to place the pilot valve in the open position, and the motor generates rotational motion in a second direction opposite the first direction to place the pilot valve in the closed position.

13. The flush valve assembly of claim 11 wherein:

the sensor is an optical sensor, and when the flag is positioned in a gap of the sensor, the flag interrupts the optical sensor to indicate a position of the driving gear correlated to the open position of the valve cartridge.

14. The flush valve assembly of claim 11 wherein the motor is a direct current (DC) motor.

15. The flush valve assembly of claim 11 wherein the motor comprises at least a three-hundred to one (300:1) gear ratio.

16. A method for operating a flush valve assembly, the method comprising the steps of:

(a) providing a fluid under pressure from a fluid inlet to a valve cartridge via a fluid passageway in a valve housing;

(b) providing a controller connected to a sensor and a motor, the controller configured to execute a flush cycle including the steps of:
- instructing the motor to initiate rotational motion in a first direction;
- identifying the valve cartridge is in an open position when a flag interrupts a sensor to indicate a position of a driving gear correlated to the open position;
- instructing the motor to stop rotational motion when the open position is identified;
- instructing the motor to initiate rotational motion in a second direction opposite the first direction after a pre-determined amount of time has elapsed;
- identifying the valve cartridge is in a closed position when the flag no longer interrupts the sensor to indicate a position of the driving gear correlated to the closed position; and
- instructing the motor to stop rotational motion when the closed positioned is identified.

17. The method of claim 16 further comprising the steps of:

(c) communicating the fluid through a bypass opening in a diaphragm assembly into a chamber, the diaphragm assembly is disposed in the fluid passageway and is movable between an opened position in which the diaphragm assembly is not in contact with a diaphragm valve seat and a closed position in which the diaphragm assembly is in contact with the diaphragm valve seat, wherein the chamber is established by a presence of the diaphragm assembly in the fluid passageway;

(d) communicating the fluid in the chamber into the valve cartridge;

(e) rotating the valve cartridge into an open position;

(f) communicating the fluid through the valve cartridge to a fluid outlet; and (g) translating a diaphragm assembly from a closed position to an open position such that the diaphragm assembly is unseated from a diaphragm valve seat permitting water to pass from the fluid inlet to the fluid outlet.

* * * * *